US005440082A

United States Patent [19]

Claes

[11] Patent Number: 5,440,082

[45] Date of Patent: Aug. 8, 1995

[54] METHOD OF MANUFACTURING AN IN-THE-EAR HEARING AID, AUXILIARY TOOL FOR USE IN THE METHOD, AND EAR MOULD AND HEARING AID MANUFACTURED IN ACCORDANCE WITH THE METHOD

[75] Inventor: Rudi-A. M. Claes, Eindhoven, Netherlands

[73] Assignee: U.S. Philips Corporation, New York, N.Y.

[21] Appl. No.: 943,366

[22] Filed: Sep. 10, 1992

[30] Foreign Application Priority Data

Sep. 19, 1991 [EP] European Pat. Off. ........... 91202438

[51] Int. Cl.[6] .............................................. B29C 33/40

[52] U.S. Cl. ...................................... 181/135; 249/55; 264/222; 264/313; 425/2; 425/472

[58] Field of Search ...................... 264/222, 271.1, 275, 264/313, DIG. 30; 249/83, 55; 425/2, 470, 472; 181/130, 135

[56] References Cited

U.S. PATENT DOCUMENTS

| | | | |
|---|---|---|---|
| 1,077,766 | 11/1913 | Von Suchorzynski | 181/130 |
| 1,755,775 | 4/1930 | Dunn | 264/222 |
| 3,440,314 | 4/1969 | Frisch | 264/222 |
| 4,006,796 | 2/1977 | Cochorst | 181/135 |
| 4,091,067 | 5/1978 | Kramer et al. | 264/222 |
| 4,349,083 | 9/1982 | Bennett | 181/135 |
| 4,569,812 | 2/1986 | Werwath et al. | 264/222 |
| 4,834,927 | 5/1989 | Birkholz et al. | 264/222 |
| 5,201,007 | 4/1993 | Ward et al. | 181/130 |

FOREIGN PATENT DOCUMENTS

| | | | |
|---|---|---|---|
| 127274 | 4/1948 | Australia | 264/222 |
| 2667500 | 4/1992 | France . | |
| 3618002 | 1/1988 | Germany . | |
| 468604 | 7/1937 | United Kingdom | 181/135 |
| 2084072 | 4/1982 | United Kingdom | 264/222 |
| 90/03089 | 3/1990 | WIPO . | |

*Primary Examiner*—Jay H. Woo
*Assistant Examiner*—Robert B. Pavis
*Attorney, Agent, or Firm*—Bernard Franzblau

[57] ABSTRACT

In a method of manufacturing an in-the-ear hearing aid (25), a mould (23) is made of an ear canal for use as a moulding die for making a housing of the hearing aid. After the mould is made an auxiliary tool made up of a flexible tube (11) with a flange at one end is inserted into the ear canal into the proximity of the tympanic membrane of the ear. Subsequently, a curable material (19) is introduced into the ear canal. The material presses the flange against the tympanic membrane, which precludes the ingress of material between the flange and the tympanic membrane. After the material has cured the mould with the tube and the flange is removed from the ear canal. During removal of the mould the space between the tympanic membrane and the mould is in communication with the outer air via the tube, so that no partial vacuum is produced which otherwise might damage the tympanic membrane. The mould obtained is used as a moulding die for making a custom made in-the-ear hearing aid.

13 Claims, 2 Drawing Sheets

METHOD OF MANUFACTURING AN IN-THE-EAR HEARING AID, AUXILIARY TOOL FOR USE IN THE METHOD, AND EAR MOULD AND HEARING AID MANUFACTURED IN ACCORDANCE WITH THE METHOD

BACKGROUND OF THE INVENTION

This invention relates to a method of manufacturing an in-the-ear heating aid which is inserted into an ear canal of a person against or near a tympanic membrane, which method employs a mould of the ear canal of the person's ear. The mould is used for making a moulding die for the manufacture of a heating-aid housing. An auxiliary tool comprising a flexible tube having a flange at one end is inserted into the ear canal with said end in order to form the mould, after which a curable material is introduced into the ear canal and, after the material has cured, the material with the tube and the flange is removed from the ear canal.

The external shape of such in-the-ear hearing aids should correspond to the shape of the ear canal. In order to determine the shape of the ear canal moulds are made of the ear canal of a person. These moulds define the dimensions of hearing-aid housings to be manufactured.

A method of making an ear mould is known from U.S. Pat. No. 3,440,314. The ear mould described therein is used for holding a hearing-aid receiver. In the prior-art method the flange closes the tube at one end and the tube is inserted into the ear canal over a part of the length of the ear canal. Subsequently, the tube is filled with a liquid metal which after solidifying keeps the tube in position. After removal of the mould the solidified material and the flange are removed and the tube serves as the acoustic duct. Since this receiver is not fitted in the ear canal the ear mould is formed over only a part of the ear canal.

In modern hearing aids the heating aid is situated near or against the tympanic membrane of the ear. If such a hearing aid is to be custom-made, a mould up to the tympanic membrane is required. If the prior art method would be used for making an ear mould up to the tympanic membrane, a partial vacuum would be produced between the tympanic membrane and the ear mould during removal of the mould, so that removal would be painful or might even cause damage to the tympanic membrane. Ear moulds up to only half the length of the ear canal do not present this problem because the partial vacuum which can be produced is much smaller owing to the large volume of air in the rear part of the ear canal. Moreover, when such ear moulds are removed the ear canal is deformed at the location of the mould, for example, by pulling at the auricle, thereby admitting air past the ear mould to the space between the ear mould and the tympanic membrane. This is not possible in the case of ear moulds which extend up to the tympanic membrane because starting from the tympanic membrane the ear canal is surrounded with non-deformable bony tissue over some distance, so that this part of the ear canal cannot deform.

SUMMARY OF THE INVENTION

It is an object of the invention to provide a method of the type defined in the opening paragraph which enables the ear mould to be removed without pain and without the risk of damage to the tympanic membrane. To this end the method in accordance with the invention is characterised in that the flange has an opening situated opposite the opening of the end of the tube, so that the tube is open at both ends, and the tube with the flange is brought at least into the proximity of a tympanic membrane of the ear and the curable material presses the flange against the tympanic membrane, thereby precluding the ingress of material between the flange and the tympanic membrane. During removal of the ear mould the space between the tympanic membrane and the ear mould thus communicates with the outer air via the tube and air can enter the space so that no partial vacuum is formed.

An embodiment of the method in accordance with the invention is characterised in that before the tube is inserted into the ear canal the tube is closed at a further end, and before the mould is removed from the ear canal the tube is opened at the further end. This reduces the likelihood of the tube being obstructed in that curable material leaking between the flange and the tympanic membrane enters the tube. By closing the tube at the further end the pressure in the tube increases during insertion of the tube into the ear canal, which reduces the likelihood of curable material entering the tube.

The invention also relates to an auxiliary tool for use in the method in accordance with the invention, the tool comprising a tube provided with a flange, and to an ear mould and a hearing aid manufactured by means of the method in accordance with the invention.

The auxiliary tool in accordance with the invention is characterised in that the tube and the flange form an integral unit i.e. a single unitary structure. This reduces the likelihood of the flange being severed from the tube during insertion of the tube with the flange into the ear canal.

BRIEF DESCRIPTION OF THE DRAWING

The invention will now be described in more detail, by way of example, with reference to the accompanying drawings. In the drawings.

DESCRIPTION OF THE PREFERRED EMBODIMENTS

Figure 1:
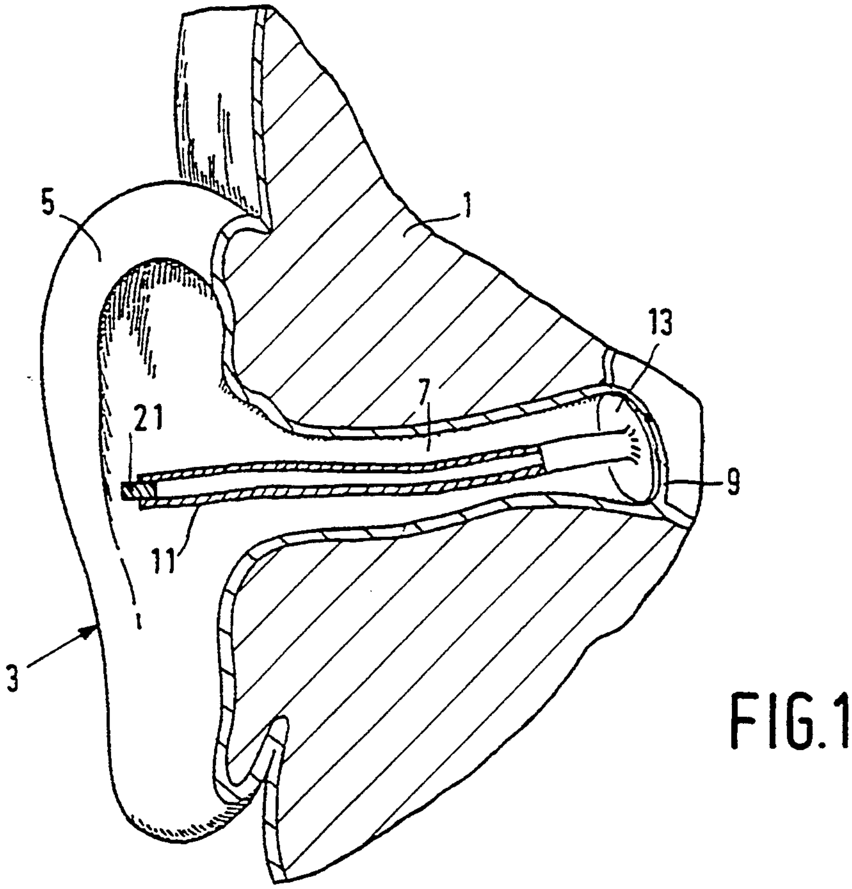
FIG. 1 is a sectional view of a head at the location of an ear with a tube in the ear canal.

FIG. 1 is a sectional view of a head 1 at the location of an ear 3. The ear 3 has an external auricle 5 and an internal ear canal 7, which at one end is terminated by a tympanic membrane 9. To manufacture an in-the ear hearing aid, which is introduced into the ear canal against or in the proximity of the ear canal, it is necessary to form a mould of the ear canal in order to define the shape of the hearing aid to be manufactured. In order to form a mould of the ear canal 7 up to the tympanic membrane 9, a flexible tube 11 having a flange 13 at one end is inserted into the ear canal 7 up to a point near or against the tympanic membrane 9 of the ear 3. The flange 13 is of a flexible material and is thin, so that the flange 13 conforms to the shape of the tympanic membrane 9. The flange 13 has an opening 15 (see FIG.

3) opposite the opening 17 at the end of the tube so that the tube 11 is open at both ends.

Figure 2:
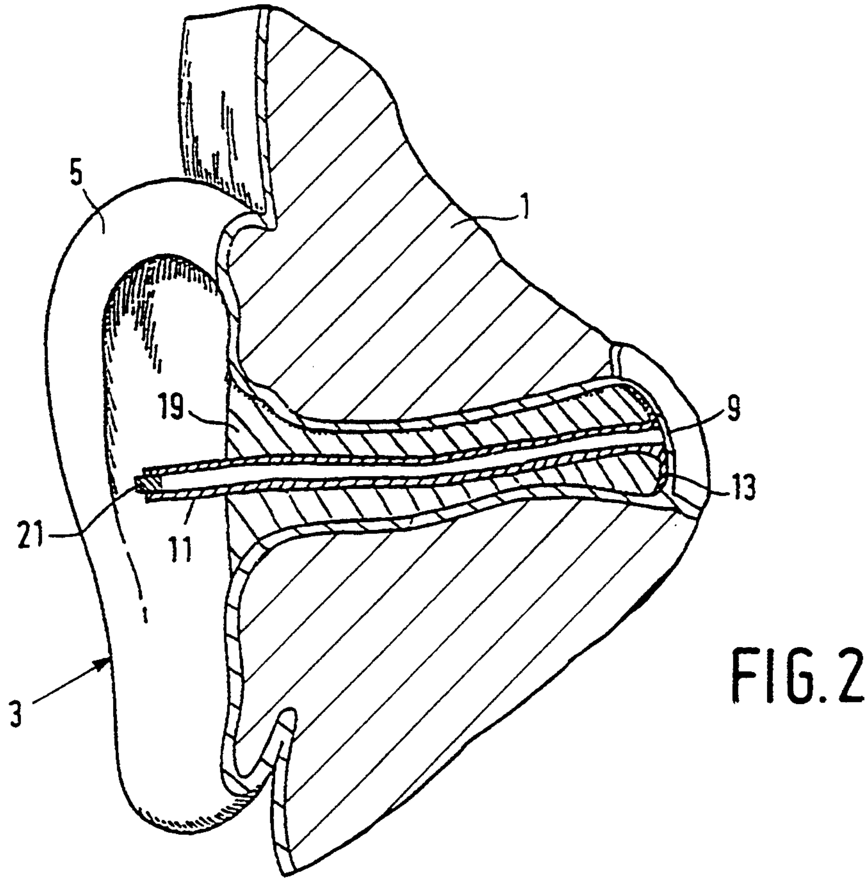
FIG. 2 is sectional view similar to that of FIG. 1 with curable material in the ear canal.

Before the tube 11 is inserted into the ear canal 7 and before a curable material 19 is introduced into the ear canal 7 to form the mould, the tube 11 is closed by means of a plug 21 (see FIG. 2) at the outer end, which reduces the likelihood of the tube 11 being obstructed by the curable material 19 leaking between the flange 13 and the tympanic membrane 9. By closing the tube 11 the pressure in the tube 11 increases during insertion of the tube 11 into the ear canal 7, which reduces the likelihood of curable material 19 entering the tube. Subsequently, the curable material 19, for example a two-component silicone compound, is introduced into the ear canal 7, the material 19 pressing the flange 13 against the tympanic membrane 9, which precludes the ingress of material 19 between the flange 13 and the tympanic membrane 9.

Figure 3:
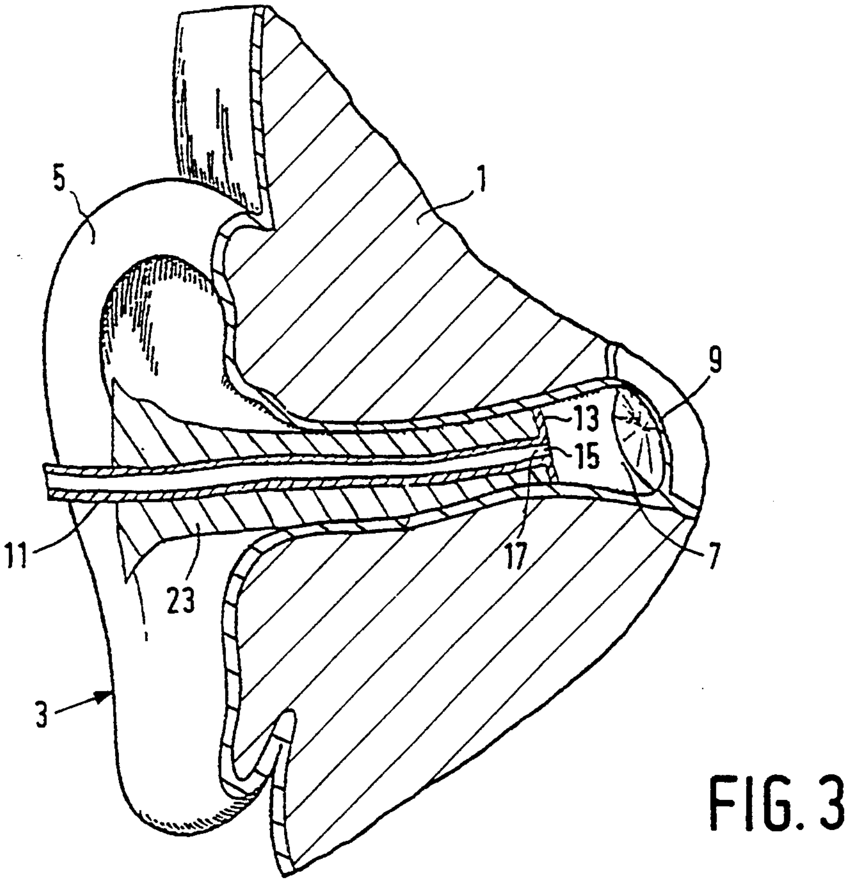
FIG. 3 is a sectional view similar to that of FIG. 2, the ear mould being partly removed from the ear canal.

After the material 19 has cured the mould 23 with the tube 11 and the flange 13 can be removed from the ear canal 7 (see FIG. 3). Before the mould 23 is removed from the ear canal 7 the plug 21 is removed from the tube 11 to bring the space between the tympanic membrane 9 and the mould 23 into communication with the outer air, so that no partial vacuum is formed in this space which might otherwise lead to damaging of the tympanic membrane 9. For a satisfactory bonding between the curable material 19 and the tube 11 with the flange 13 the tube and the flange are preferably made of the same material as the curable material, in the present case a silicone compound. The ear mould 23 thus obtained is used to make a moulding die for the manufacture of a custom-made in-the-ear hearing aid.

Figure 4:
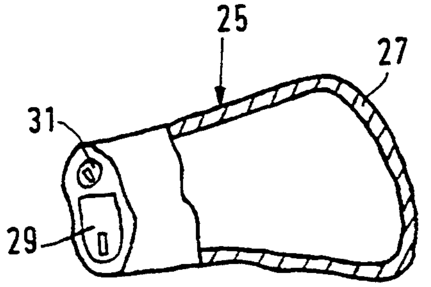
FIG. 4 shows an in-the-ear heating aid manufactured by means of the method in accordance with the invention.

FIG. 4 shows an in-the-ear hearing aid 25 manufactured by the method in accordance with the invention. First a moulding die is made from the ear mould 23. This moulding die is filled with a curable plastic which adopts the shape of the ear canal 7. After removal of the moulding die the housing 27 of the hearing aid 25 is obtained. In this housing 27 electronic components are mounted, after which the housing is closed by a cap provided with a volume control 31 and a cover 29 giving access to a battery holder.

Although the invention has been described above with reference to the drawings it is to be noted that the invention is not limited to the embodiment shown in the drawings. The invention also extends to all embodiments which deviate from that shown in the drawings, but are within the scope of the Claims and which utilise the basic idea of the invention.

I claim:

1. A method of making an in-the-ear hearing aid for insertion into an ear canal of a person in proximity to a tympanic membrane, which method employs a mould of the ear canal of the person's ear, which mould is used for making a moulding die for the manufacture of a hearing-aid housing, comprising the steps of: inserting an auxiliary tool comprising a flexible tube having a flange at one end into the ear canal with said one end in the ear canal in order to form the mould, thereafter introducing a curable material into the ear canal and, after the material has cured, removing the material with the tube and the flange from the ear canal, wherein the flange has an opening situated opposite the opening of the end of the tube so that the tube is open at both ends, wherein the step of inserting the auxiliary tool comprises bringing the tube with the flange into the proximity of the tympanic membrane such that the step of introducing the curable material presses the flange against the tympanic membrane, thereby precluding the ingress of material between the flange and the tympanic membrane.

2. A method as claimed in claim 1, further comprising, before the tube is inserted into the ear canal, closing the tube at a further end, and before the mould is removed from the ear canal, opening the tube at the further end.

3. An auxiliary tool comprising a tube provided with an opening at one end with a flange at an opposite end for use in making a mold for a housing of an in-the-ear hearing aid, wherein the tube and the flange form an integral unit, and a removeable plug for closing said opening before the auxiliary tool is inserted into an ear canal.

4. A mould for making a hearing aid housing, said mould comprising a body having a longitudinal passage way of approximately uniform cross-section and open at each end thereof, said body being shaped and dimensioned to fit closely within the ear canal and being made of a curable material and being produced in accordance with the following method;

inserting an auxiliary tool into the ear canal so that a flange thereof is brought into at least close proximity to the tympanic membrane of the ear canal, said auxiliary tool comprising a flexible tube having a flange at one end wherein the flange has an opening in communication with the opening at the one end of the flexible tube so that the tube is open at both ends, introducing a curable material into the ear canal such that the curable material presses the flange against the tympanic membrane so as to prevent the entry of material between the flange and the tympanic membrane, allowing the curable material to harden to form a mould of the ear canal, and removing the mould along with the auxiliary tool from the ear canal.

5. An in-the-ear hearing aid comprising a housing made of a curable plastic material with its outer surface shaped and dimensioned to correspond to the ear canal of a person such that said housing is adapted to be positioned in proximity to the tympanic membrane in said ear canal and is further adapted to mount electronic components of the hearing aid inside of the housing, a cover for closing the housing, and a volume control element located on the housing for manipulation by a person wearing the hearing aid, wherein a mould for making said housing is produced in accordance with the following method;

inserting an auxiliary tool into the ear canal so that a flange thereof is brought into at least close proximity to the tympanic membrane of the ear canal, said auxiliary tool comprising a flexible tube having a flange at one end wherein the flange has an opening in communication with the opening at the end of the flexible tube so that the tube is open at both ends, introducing a curable material into the ear canal such that the curable material presses the flange against the tympanic membrane so as to prevent the entry of material between the flange and the tympanic membrane, allowing the curable material to harden to form a mould of the ear canal, and removing the mould along with the auxiliary tool from the ear canal.

6. A method of making a mould for the housing of a custom made in-the-ear hearing aid comprising:

providing an auxiliary tool comprising a flexible tube having a flange at one end wherein the flange has an opening in communication with the opening at the one end of the flexible tube so that the tube is open at both ends, inserting the auxiliary tool into the ear canal so that the flange is brought into at least close proximity to the tympanic membrane of the ear canal, introducing a curable material into the ear canal such that the curable material presses the flange against the tympanic membrane so as to prevent the entry of material between the flange and the tympanic membrane, allowing the curable material to harden to form a mould of the ear canal, and removing the mould with the auxiliary tool from the ear canal.

7. A method as claimed in claim 6 further comprising:

closing the tube at the other end before the step of inserting the auxiliary tool into the ear canal, and before the step of removing the mould and auxiliary tool and after the step of introducing the curable material into the ear canal, opening said other end of the tube.

8. A method as claimed in claim 7 wherein the flange is made of a flexible material, said method comprising the further step of separating the auxiliary tool from the mould after removing the mould and auxiliary tool from the ear canal.

9. For use in a method of making a mould of an ear canal for further use in the making of an in-the-ear hearing aid, an auxiliary tool comprising:

a flexible tube with a flexible flange at one end, said flexible flange having an opening therein that communicates with the opening at the one end of the flexible tube such that the tube is open at both ends to provide an air passage through the tube and flange.

10. An auxiliary tool as claimed in claim 9 wherein the tube and flange comprise an integral single unitary structure.

11. An auxiliary tool as claimed in claim 9, wherein said flexible flange is thin enough so that it conforms to the shape of the tympanic membrane when the auxiliary tool is inserted in an ear canal and with the flange in proximity to said tympanic membrane.

12. The auxiliary tool as claimed in claim 9 wherein said flexible tube is open at the other end remote from said one end, and means for opening and closing said other end of the flexible tube so that said other end can be closed before the auxiliary tool is inserted into an ear canal and can be opened before removal of the auxiliary tool from the ear canal.

13. The auxiliary tool as claimed in claim 9, wherein an end of the flexible tube remote from said one end is not connected to any external component and said one end of the tube is adapted to be inserted in an ear canal with said flange in close proximity to the tympanic membrane.

* * * * *